United States Patent
Kimura et al.

(10) Patent No.: US 9,343,973 B2
(45) Date of Patent: May 17, 2016

(54) POWER CONVERSION APPARATUS

(71) Applicants: DENSO CORPORATION, Kariya, Aichi-pref. (JP); NIPPON SOKEN, INC., Nishio, Aichi-pref. (JP)

(72) Inventors: Norihito Kimura, Hekinan (JP); Kimikazu Nakamura, Handa (JP); Yuji Hayashi, Kasugai (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 0 days.

(21) Appl. No.: 14/149,940

(22) Filed: Jan. 8, 2014

(65) Prior Publication Data

US 2014/0198537 A1  Jul. 17, 2014

(30) Foreign Application Priority Data

Jan. 11, 2013  (JP) ................. 2013-003529

(51) Int. Cl.
*H02M 3/335* (2006.01)
*H02M 1/44* (2007.01)
*H02M 3/337* (2006.01)
*H02M 7/5387* (2007.01)
*H02M 1/00* (2006.01)

(52) U.S. Cl.
CPC ............ *H02M 3/33507* (2013.01); *H02M 1/44* (2013.01); *H02M 3/3376* (2013.01); *H02M 7/53871* (2013.01); *H02M 2001/0035* (2013.01); *Y02B 70/16* (2013.01)

(58) Field of Classification Search
CPC ................................ H02M 3/33507
USPC .......................................................... 363/17
See application file for complete search history.

(56) References Cited

U.S. PATENT DOCUMENTS

| | | | | |
|---|---|---|---|---|
| 8,537,570 B2 * | 9/2013 | Balakrishnan | ........ | H02M 3/335 323/283 |
| 8,593,123 B2 * | 11/2013 | Chen | .................. | H02M 3/1563 323/282 |
| 2008/0084723 A1 | 4/2008 | Balakrishnan et al. | | |
| 2009/0073733 A1 | 3/2009 | Balakrishnan et al. | | |
| 2010/0202175 A1 | 8/2010 | Balakrishnan et al. | | |
| 2011/0211373 A1 | 9/2011 | Balakrishnan et al. | | |
| 2012/0224399 A1 | 9/2012 | Balakrishnan et al. | | |
| 2014/0198538 A1 | 7/2014 | Kimura et al. | | |

FOREIGN PATENT DOCUMENTS

| | | |
|---|---|---|
| JP | 2008-092793 | 4/2008 |
| JP | 2014-138468 | 7/2014 |

\* cited by examiner

*Primary Examiner* — Timothy J Dole
*Assistant Examiner* — Htet Z Kyaw

(57) ABSTRACT

A power conversion apparatus includes a switch circuit which activates switching elements on the basis of a control signal, a feedback means which performs feedback control, a signal output means which outputs the control signal on the basis of a control variable of the feedback control, and a mode switching means which controls switching operation of the switch circuit by switching an operation mode between a normal mode and an intermittent mode in which the number of operations is less than that in the normal mode. The mode switching means changes timing of switching from the normal mode to the intermittent mode, on the basis of either or both of a first detection value which is an input value inputted to the switch circuit and a second detection value which is an output value outputted from the switch circuit.

14 Claims, 10 Drawing Sheets

POWER CONVERSION APPARATUS

CROSS-REFERENCE TO RELATED APPLICATION

This application is based on and claims the benefit of priority from earlier Japanese Patent Application No. 2013-003529 filed Jan. 11, 2013, the description of which is incorporated herein by reference.

BACKGROUND

1. Technical Field

The present invention relates to a power conversion apparatus that includes a switch circuit, a feedback means and a signal generating means.

2. Related Art

In a burst mode operation based on conventional art, some switching frequency that falls in an audible frequency band may cause audible noise. Therefore, a technique has been developed, aiming to avoid such frequency that causes audible noise. An example of such an invention is disclosed in a patent document JP-A-2008-092793, the invention being entitled "Method and apparatus for reducing audible frequency in a switching power supply". According to the technique, control is exerted over periods corresponding to groups of switching cycles of a switch, and over non-switching periods corresponding to intervals between the groups of switching cycles of the switch.

According to the technique disclosed in JP-A-2008-092793, when a turn-on period of a switch exceeds a threshold that indicates a small load, fixed frequency pulse-width modulation is merely changed to multicycle modulation, on the basis of the turn-on period of the switch. In an application of an in-vehicle DC/DC converter, for example, in which input/output voltage of a vast range varies, an amount of load can change a primary-side current peak, depending on the input/output voltage. Therefore, in the case where a fixed threshold is applied to the turn-on period, load current may vary to a large extent when the operation mode is switched to a burst mode. This may raise a problem of impairing the system efficiency over the entire operating range.

SUMMARY

An embodiment provides a power conversion apparatus which can minimize the variation of load current in switching an operation mode in the event that input/output conditions are varied, thereby enhancing system efficiency over an entire operating range.

As an aspect of the embodiment, a power conversion apparatus includes a switch circuit which activates switching elements on the basis of a control signal, a feedback means which performs feedback control, a signal output means which outputs the control signal on the basis of a control variable of the feedback control, and a mode switching means which controls switching operation of the switch circuit by switching an operation mode between a normal mode and an intermittent mode in which the number of operations is less than that in the normal mode. The mode switching means changes timing of switching from the normal mode to the intermittent mode, on the basis of either or both of a first detection value which is an input value inputted to the switch circuit and a second detection value which is an output value outputted from the switch circuit.

DETAILED DESCRIPTION OF THE PREFERRED EMBODIMENTS

Figure 1:
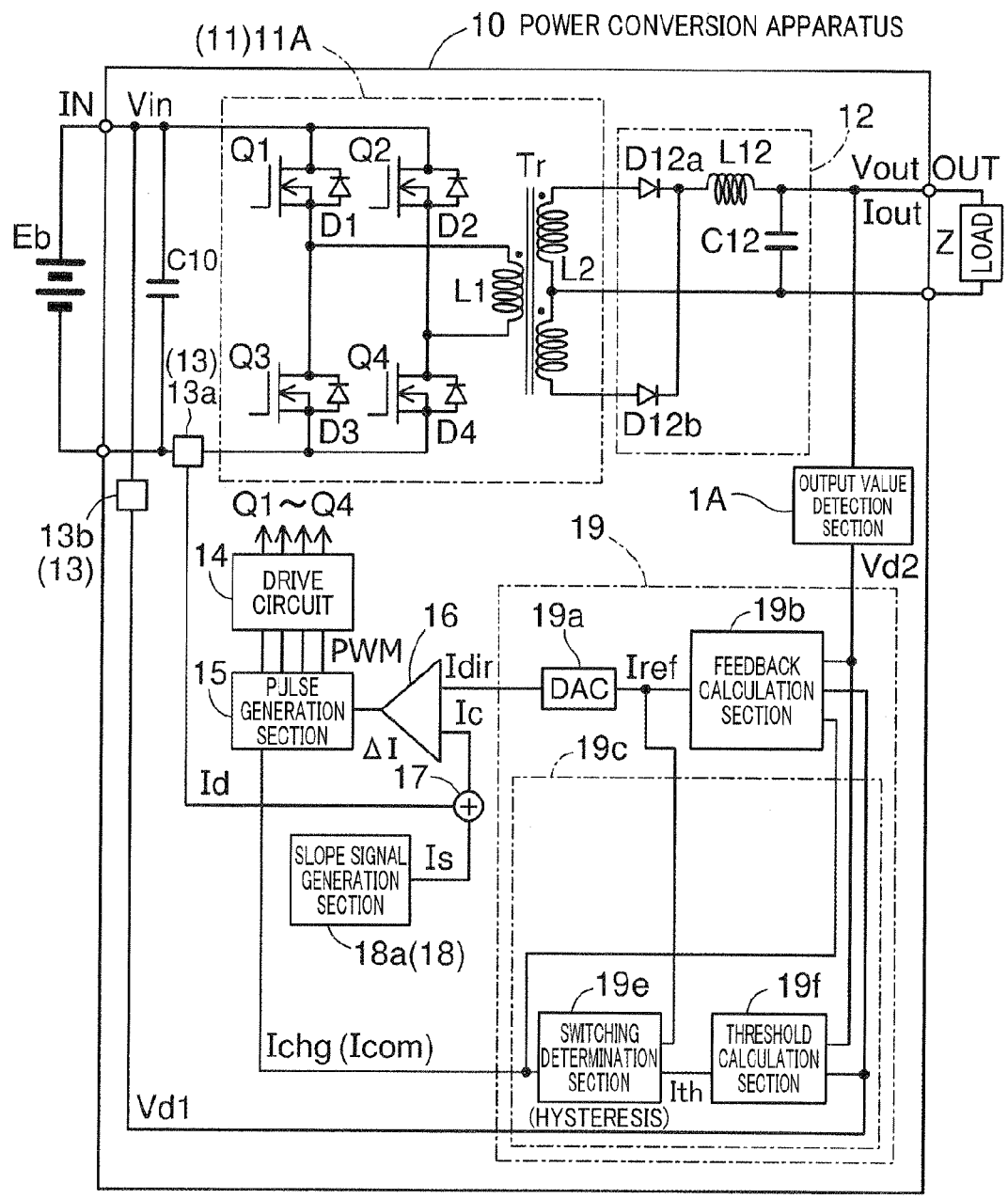
FIG. 1 is a schematic diagram illustrating an example of a first configuration of a power conversion apparatus.

With reference to the accompanying drawings, hereinafter are described some embodiments of the present invention. In the following description, the term "connect" or "connection" refers to "electrically connect" or "electrical connection" unless otherwise specified. The drawings indicate the elements required for describing the present invention but do not necessarily indicate all the actually used elements. When vertical or horizontal directions are referred to, the directions correspond to the up and down direction and the right and left direction as viewed in the drawings. The alpha-numerals in series are simply indicated using a symbol "-". For example, the term "switching elements Q1-Q4" refers to "switching elements Q1, Q2, Q3 and Q4". The term "switching cycle" refers to a period required for all the switching elements included in a switch circuit to be turned on/off.

[First Embodiment]

Referring to FIGS. 1 to 6, hereinafter is described a first embodiment. A power conversion apparatus 10 shown in FIG. 1 is an example of a switching power supply apparatus (DC/DC converter). The power conversion apparatus 10 has a function of converting an input voltage Vin (e.g., 288 [V]) to a required output voltage Vout (e.g., 14 [V]) and outputting the converted voltage. The power conversion apparatus 10 has an input terminal IN to which a power source Eb is connected, and has an output terminal OUT to which a load Z is connected. For example, the power source Eb corresponds to a battery (secondary cell, or the like) or a fuel cell. For example, the load Z corresponds to a battery having a power source capacity which is different from that of the power source Eb, or corresponds to a rotary electric machine (motor-generator, generator, motor, or the like) or a headlamp. The output voltage Vout may be set to an optionally selected value. The output voltage Vout may be set in the power conversion apparatus 10 or may be set on the basis such as of signals or data received from an external processor (e.g., ECU or computer).

The power conversion apparatus 10 shown in FIG. 1 includes a capacitor C10, switch circuit 11A, transformer Tr, rectifying/smoothing circuit 12, first detection sections 13a, drive circuit 14, pulse generation section 15, signal comparison section 16, signal calculation section 17, slope signal generation section 18, feedback means 19 and second detection section 1A. The components of the power conversion apparatus 10 are briefly described below. In the power conversion apparatus 10, various signals, such as a detection current value Id and a detection voltage value Vd, are dealt with in a form that can be processed (e.g., voltage value or data) in each of the components, unless otherwise specified.

The capacitor C10 smoothes the input voltage Vin which is inputted from the power source Eb.

The switch circuit 11A includes switching elements Q1-Q4, diodes D1-D4 and the transformer Tr. The switching elements Q1-Q4 are configured into a full-bridge circuit and are turned on/off in accordance with a pulse-width modulation signal PWM (corresponding to control signal) which is inputted to an input terminal (e.g., gate terminal) of each of the elements from the drive circuit 14. Each of the diodes D1-D4 is parallelly connected between an input terminal (e.g., drain terminal) and an output terminal (e.g., source terminal) of the corresponding one of the switching elements Q1-Q4. These diodes function as freewheel diodes. The output terminal of the switching element Q1 and the input terminal of the switching element Q3 are connected to each other via a connecting point which is connected to one terminal of a primary coil L1 of the transformer Tr. Similarly, the output terminal of the switching element Q2 and the input terminal of the switching element Q4 are connected to each other via a connecting point which is connected to the other terminal of the primary coil L1 of the transformer Tr.

The transformer Tr includes the primary coil L1 and a secondary coil L2 having a center tap. Connection of the primary coil L1 is established as mentioned above. Both ends of the secondary coil L2 are connected to one end side (positive side) of the output terminal OUT via diodes D12a and D12b and a coil L12. The center tap of the secondary coil L2 is connected to the other end side (negative side) of the output terminal OUT.

The rectifying/smoothing circuit 12 includes a rectifying section that performs full-wave rectification, and a smoothing section that smoothes the output voltage Vout. In the configuration shown in FIG. 1, the rectifying section includes the diodes D12a and D12b to rectify alternating-current (AC) voltage outputted from the secondary coil L2 to direct-current (DC) voltage. The smoothing section serves as an LC filter which includes the coil L12 and a capacitor C12. The diode D12a is connected in series with the coil L12 and the serial connection is connected to an end side of the output terminal OUT. The capacitor C12 is connected to the both ends of the output terminal OUT. The second detection section 1A, which will be described later, is connected to an end side of the output terminal OUT (an end side of the capacitor C12 in particular) to detect the output voltage Vout.

The first detection section 13a detects the detection current value Id (corresponding to input value) inputted to the switch circuit 11A. A first detection section 13b detects the detection voltage value Vd1 (corresponding to input value) inputted to the switch circuit 11A. The second detection section 1A detects the output voltage Vout outputted from the switch circuit 11A as a detection voltage value Vd2 (corresponding to output value). The detection voltage value Vd1 of the present embodiment corresponds to "first detection value" and the detection voltage value Vd2 corresponds to "second detection value". Generally, the detection current value Id and the detection voltage value Vd1 vary in a manner of a waveform signal, while the detection voltage value Vd2 varies in accordance with the conditions such as of the load Z.

The drive circuit 14 and the pulse generation section 15 correspond to "signal output means". The pulse generation section 15 generates and outputs a pulse wave (pulse-width modulation signal PWM in the present embodiment) on the basis of a differential current value ΔI transmitted from the signal comparison section 16 described later, and a switching signal Ichg transmitted from a switching determination section 19e described later. The drive circuit 14 amplifies and outputs the pulse-width modulation signal PWM transmitted from the pulse generation section 15, so that a corresponding one of the switching elements Q1-Q4 is activated.

The slope signal generation section 18a generates and outputs a slope signal value Is for gradually increasing (or gradually decreasing) a targeted signal (detection voltage value Vd1 in the example shown in FIG. 1). The slope signal value Is varies with time in a manner of a sawtooth wave and is reset at every predetermined cycle. The signal calculation section 17 adds up the detection current value Id and the slope signal value Is and outputs the sum as a composite current value Ic. The signal comparison section 16 (comparator) calculates and outputs the differential current value ΔI that is a difference between the composite current value Ic, as a reference value transmitted from the signal calculation section 17, and a command current value Idir transmitted from the feedback means 19 (specifically, DAC 19a) described later.

The feedback means 19 indicated by a dash-dot line in FIG. 1 includes the DAC 19a (digital-analog converter), a feedback calculation section 19b and a mode switching means 19c. The mode switching means 19c indicated by another dash-dot line in FIG. 1 includes a switching determination section 19e and a threshold calculation section 19f. Components included in the feedback means 19 are briefly described hereinafter along a flow of processing. The feedback means 19 may be configured by a hardware member or may be configured by a software member in which a CPU executes a program.

The feedback calculation section 19b performs calculation on the basis of either or both of the detection values, i.e. the detection voltage value Vd1 transmitted from the first detection section 13b and the detection voltage value Vd2 transmitted from the second detection section 1A, and outputs a feedback control variable Ipi. In the present embodiment, the feedback calculation section 19b performs calculation for proportional control (P control) and integral control (I control) so that a required output voltage Vout is achieved. As necessary, the feedback calculation section 19b may additionally perform calculation for differential control (D control).

When operation mode is switched from a normal mode Nmode to an intermittent mode Imode in accordance with the switching signal Ichg transmitted from the switching determination section 19e described later, it will be much better if the integral term associated with the integral control is initialized to zero. Also, in the intermittent mode Imode, it will be much better if a gain value used in feedback control in the subsequent normal mode Nmode is changed on the basis of the detection voltage value Vd1 (input value). The gain value is set to a smaller value, as the detection voltage value Vd1 becomes larger. Specifically, one or more of a proportional gain, an integral gain and a differential gain are appropriately selected and set on the basis such as of a function and a characteristic line (see FIGS. 2 and 3).

The DAC 19a converts a control current value Iref (data corresponding to controlled variable) transmitted from the feedback calculations section 19b to the command current value Idir that is an analog signal and outputs the converted signal.

The switching determination section 19e determines switching of the operation mode (normal mode Nmode or intermittent mode Imode) of the switching elements Q1-Q4. Specifically, the switching determination section 19e determines which of the normal mode Nmode and the intermittent mode Imode the operation mode should be switched to, on the basis of the control current value Iref and a threshold Ith described later. In making a determination, it will be much better if hysteresis characteristics are applied to the switching between the normal mode Nmode and the intermittent mode Imode. For example, when a switching threshold used for the switching from the normal mode Nmode to the intermittent mode Imode is indicated by "Ith", a switching threshold used for the switching from the intermittent mode Imode to the nomal mode Nmode is expressed by "Ith+α" (α is an optional value). The result of the determination is outputted, as the switching signal Ichg, to the pulse generation section 15. The switching signal Ichg may include a command signal Icom in addition to the result of the determination. The command signal Icom corresponds to a command that generates a pulse-width modulation PWM signal having a predetermined duty ratio for a predetermined time interval. The predetermined time interval and the predetermined duty ratio may be optionally set.

Figure 2:
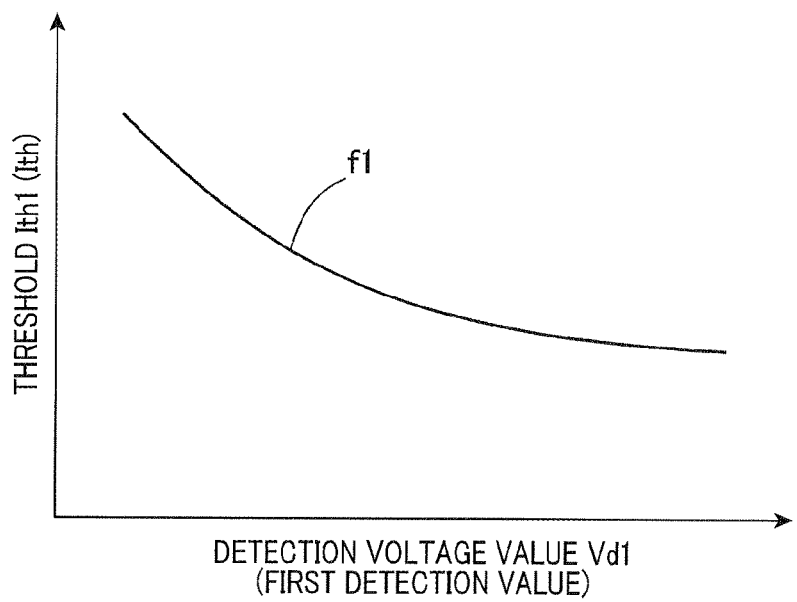
FIG. 2 is a graph illustrating first detection value relative to threshold.
Figure 3:
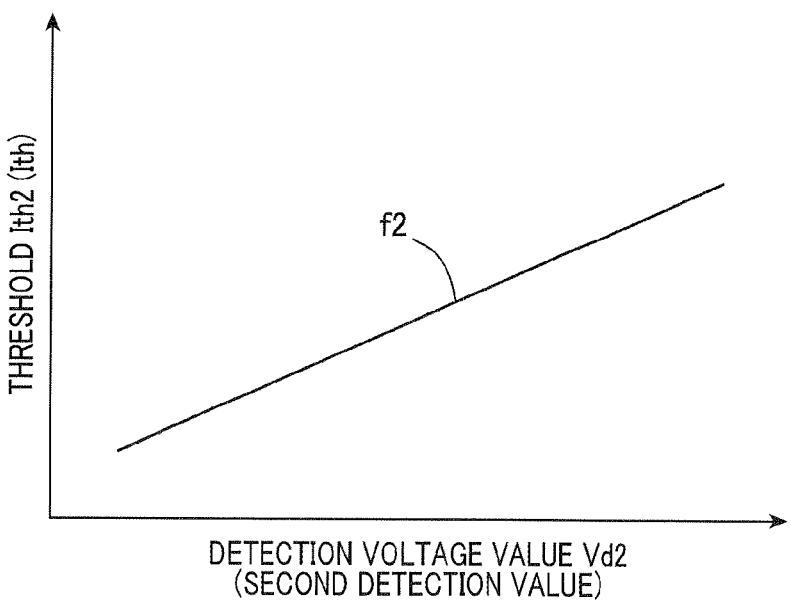
FIG. 3 is a graph illustrating second detection value relative to threshold.

The threshold calculation section 19f calculates the threshold Ith that is a reference value used in switching the normal mode Nmode to the intermittent mode Imode. The threshold value Ith is calculated on the basis of either or both of the detection voltage values Vd1 and Vd2. FIG. 2 shows an example of a relationship of threshold Ith1 (vertical axis) included in the threshold Ith, with detection voltage value Vd1 (horizontal axis). In the example shown in FIG. 2, the relationship is non-linearly (or curvilinearly) defined by a characteristic line f1. FIG. 3 shows an example of a relationship of threshold th2 (vertical axis) included in the threshold Ith, with detection voltage value Vd2 (horizontal axis). In the example shown in FIG. 3, the relationship is linearly defined by a characteristic line f2. Depending on the specification such as of the transformer Tr and the load Z, the characteristic lines f1 and f2 may be optionally defined. For example, the characteristic line f1 of FIG. 2 may be linearly defined, or the characteristic line f2 of FIG. 3 may be non-linearly defined.

Figure 4:
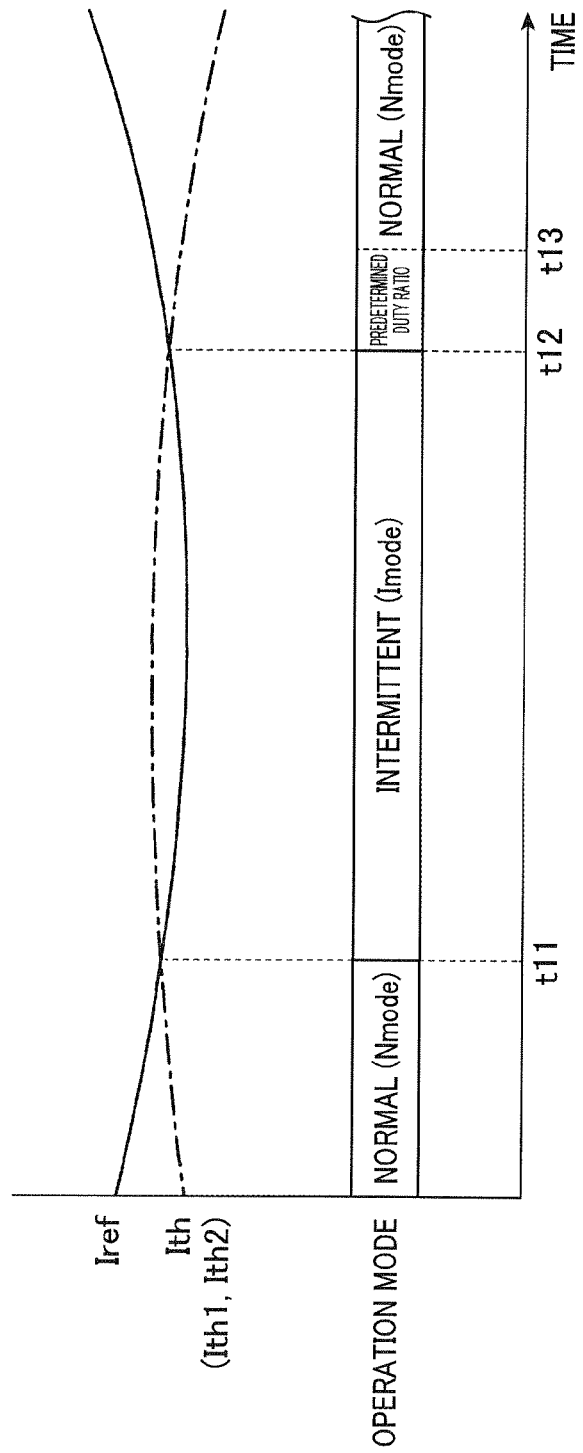
FIG. 4 is a time diagram illustrating an example of switching between a normal mode and an intermittent mode.

The configuration of the power conversion apparatus 10 has so far been described. Referring now to FIG. 4, hereinafter will be described the operation mode of the switching elements Q1-Q4 in the power conversion apparatus 10. The thresholds Ith1 and Ith2 are only the results of the calculation performed by the threshold calculation section 19f. The following description is focused on the threshold Ith1 as a representative. When a calculation value based on the thresholds Ith1 and Ith2 (e.g., threshold value Ith as an average value) is used as well, the same description as that of the threshold Ith1 applies.

In FIG. 4, the solid line indicates a characteristic line of the control current value Iref and the dash-dot line indicates a characteristic line of the threshold Ith1. For clarification, the characteristic lines in the example shown in FIG. 4 are shown with simplified curved lines. Actually, however, the lines reflect variations of the internal or external operation environment (e.g., feedback control or load Z).

As shown in FIG. 4, the control current value Iref is equal to or more than the threshold Ith1 up to time t11 and on or after time t13 (Iref≥Ith1). Accordingly, the switching determination section 19e switches the operation mode to the normal mode Nmode. In contrast, the control current value Iref is smaller than the threshold Ith1 (Iref<Ith1) in a period of from time t11 to time t13. Accordingly, the switching determination section 19e switches the operation mode to the intermittent mode Imode. When the switching signal Ichg includes the command signal Icom, the switching elements Q1-Q4 are switched with a predetermined duty ratio (e.g., 1%) during a predetermined time interval of from t12 to t13.

The operation mode of the switching elements Q1-Q4 is switched on the basis of the magnitude correlation between the control current value Iref and the threshold Ith (Ith1 or Ith2). Therefore, the timing of switching the operation mode varies. In other words, the timing of the switching from the normal mode Nmode to the intermittent mode Imode varies, or the timing of the switching from the intermittent mode Imode to the normal mode Nmode varies.

According to the first embodiment described above, the following advantageous effects can be obtained.

(1) The power conversion apparatus 10 includes the mode switching means 19c that controls switching operation of the switch circuit 11A by switching the operation mode between the normal mode Nmode and the intermittent mode Imode in which the number of switching operations is less than that in the normal mode Nmode. The mode switching means 19c is configured to change the timing of switching from the normal mode Nomode to the intermittent mode Imode, on the basis of either or both of the detection voltage value Vd1 (first detection value) that is an input value inputted to the switch circuit 11A and the detection voltage value Vd2 (second detection value) that is an output value outputted from the switch circuit 11A (see FIGS. 1 and 4). According to this configuration, in the event that the input/output conditions are varied, variation in a load current Iout is minimized in switching the operation mode (normal mode Nmode or intermittent mode Imode) of the switching elements Q1-Q4. Accordingly, the system efficiency is enhanced in the entire operating range.

(3) The mode switching means 19c is configured to change the timing of switching from the normal mode Nmode to the intermittent mode Imode, on the basis of the detection voltage values Vd1 and Vd2 (see FIGS. 1 and 4). According to this configuration, in the event that the input/output conditions are varied, variation in the load current Iout is more reliably minimized in switching the operation mode of the switching elements Q1-Q4. Accordingly, the system efficiency is more reliably enhanced in the entire operating range.

(4) The mode switching means 19c is configured to include the threshold calculation section 19f and the switching determination section 19e (see FIGS. 1 to 4). The threshold calculation section 19f calculates the threshold Ith (Ith1, Ith2) that is a reference value used in switching the operation mode from the normal mode Nmode to the intermittent mode Imode, on the basis of either or both of the detection voltage values Vd1 and Vd2. The switching determination section 19e determines whether to switch the operation mode from the normal mode Nmode to the intermittent mode Imode, on the basis of the control current value Iref and the threshold Ith. According to this configuration, the threshold Ith is calculated by the threshold calculation section 19f and whether to switch the operation mode is determined by the switching determination section 19e. Therefore, in the event that the input/output conditions are varied, variation in the load current Iout is more reliably minimized in switching the operation mode of the switching elements Q1-Q4. Accordingly, the system efficiency is more reliably enhanced in the entire operating range.

(5) The mode switching means 19c is configured to apply hysteresis characteristics to the switching between the normal mode Nmode and the intermittent mode Imode (see FIG. 1). According to this configuration, the occurrence of hunting is prevented in advance, in which the operation mode is frequently switched between the normal mode Nmode and the intermittent mode Imode in the vicinity of the threshold Ith.

(6) The feedback means 19 is configured to initialize the integral term of the feedback control to zero in switching the operation mode from the normal mode Nmode to the intermittent mode Imode (see FIG. 1). According to this configuration, the occurrence of hunting is more reliably prevented, in which the operation mode is frequently switched between the normal mode Nmode and the intermittent mode Imode.

(7) The feedback means 19 is configured to change the gain value (proportional gain, integral gain or differential gain) during the intermittent mode Imode, on the basis of the detection voltage value Vd1 (input value) (see FIG. 1). The gain value is used in the feedback control performed in the subsequent normal mode Nmode. According to this configuration, when the operation mode is transitioned from the intermittent mode Imode to the normal mode Nmode, the increase in the output voltage Vout is minimized.

(8) The mode switching means 19c is configured to transmit the command signal Icom to the signal output means when the operation mode has been switched from the intermittent mode Imode to the normal mode Nmode (see FIGS. 1 and 4). The command signal Icom corresponds to a command for generating the pulse-width modulation signal PWM of a predetermined duty ratio for a predetermined time interval. Since the power conversion apparatus 10 includes the transformer Tr (inductive element), the load current Iout may turn to a negative value. When the output voltage Vout is higher in switching the operation mode from the intermittent mode Imode to the normal mode Nmode, the potential difference also becomes larger. According to this configuration, the switching elements Q1-Q4 are switched with the pulse-width modulation signals PWM of a predetermined duty ratio for a predetermined time interval after the operation mode has been switched to the normal mode Nmode. Therefore, drastic increase of the output voltage Vout is minimized. Further, this configuration can contribute to preventing bias magnetism of the transformer Tr and preventing damage of the switching elements Q1-Q4.

(9) The switch circuit 11A is configured to include the transformer Tr that has the primary coil L1 and the secondary coil L2. The mode switching means 19c is configured to receive an input value that is the detection voltage value Vd1 (detection value) on the primary coil L1 side and to output an output value that is the detection voltage value Vd2 (detection value) on the secondary coil L2 side (see FIG. 1). According to this configuration, in the event that the input/output conditions are varied, variation in the load current Iout is minimized in switching the operation mode (normal mode Nmode or intermittent mode Imode) of the switching elements Q1-Q4 included in the switch circuit 11A. Accordingly, the system efficiency is enhanced in the entire operating range.

[Second Embodiment]

Referring to FIGS. 5 to 10, hereinafter is described a second embodiment. In the second embodiment, the components identical with or similar to those in the first embodiment are given the same reference numerals for the sake of omitting unnecessary explanation. The second embodiment is described, focusing on the differences from the first embodiment.

The second embodiment is different from the first embodiment in the configuration of the slope signal generation section 18 and the configuration of the mode switching means 19c. The slope signal generation section 18 includes a slope signal generation section 18b instead of the slope signal generation section 18a (see FIG. 1) that outputs a fixed slope signal value Is. The slope signal generation section 18b changes and outputs a slope signal value Is in response to a slope change signal Iinc described later. An example of a configuration of the slope signal generation section 18b will be described later (see FIG. 6).

The mode switching means 19c includes a threshold setting section 19g instead of the threshold calculation section 19f, and also includes an amount-of-change calculation section 19d. The threshold setting section 19g outputs a threshold Ith which is set to a fixed value, for transmission to the switching determination section 19e. The amount-of-change calculation section 19d outputs the slope change signal Iinc on the basis of either or both of the detection voltage values Vd1 and Vd2, for transmission to the slope signal generation section 18b. The slope change signal Iinc changes the amount of change per unit time of the slope signal value Is (corresponding to slope signal). The relationship of the detection voltage values Vd1 and Vd2 with the slope change signal Iinc will be described later (see FIGS. 7 and 8).

Figure 6:
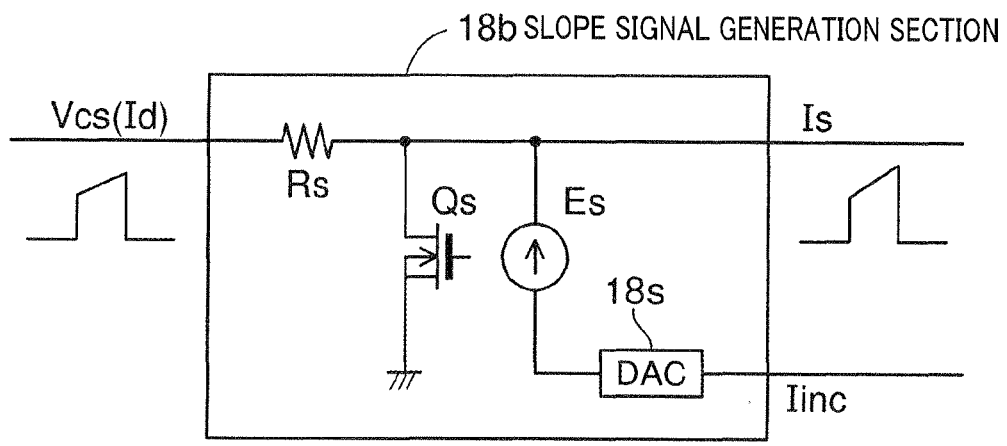
FIG. 6 is a schematic diagram illustrating an example of a configuration of a slope signal generation section.

The slope signal generation section 18b shown in FIG. 6 includes a resistor Rs, switching element Qs, current source Es and DAC 18s. The resistor Rs is connected in series with the switching element Qs and the serial connection is disposed between an input terminal of an input voltage Vcs and the ground. The resistor Rs and the switching element Qs is connected to each other via a connecting point which is connected to an output terminal of the slope signal value Is and an output terminal of the current source Es. The slope change signal Iinc (digital data) is converted to an analog signal by the DAC 18s. Based on the converted analog signal, the current source Es outputs a constant current of a predetermined value. The establishment of connection between the connecting point and the output terminal of the current source Es can change the amount of change per unit time of the slope signal value Is (pulse signal) in a turn-on period.

Figure 7:
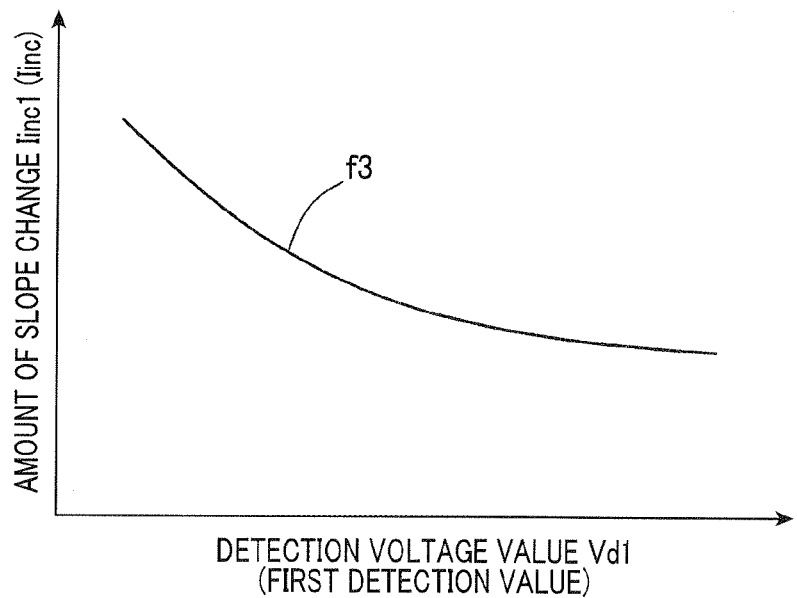
FIG. 7 is a graph illustrating first detection value relative to amount of change of the slope signal.
Figure 8:
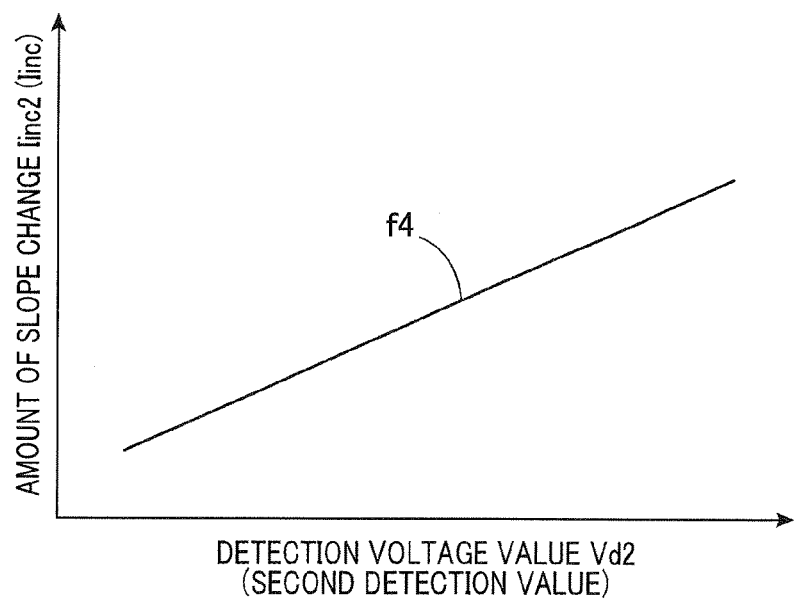
FIG. 8 is a graph illustrating second detection value relative to amount of change of the slope signal.

FIG. 7 shows an example of a characteristic line f3 which non-linearly defines a relationship between the slope change signal Iinc (vertical axis) and the detection voltage value Vd1 (horizontal axis). FIG. 8 shows an example of a characteristic line f4 which linearly defines a relationship between the slope change signal Iinc (vertical axis) and the detection voltage value Vd2 (horizontal axis). Although not shown, a relationship of the slope change signal Iinc with both of the detection voltage values Vd1 and Vd2 may be defined. For example, the relationship may be defined using a table or a map, and the definition may be framed for a relationship of a calculation value based on the detection voltage values Vd1 and Vd2 (e.g., average value), with the slope change signal Iinc (vertical axis). Similar to the characteristic lines f1 and f2 shown in FIGS. 2 and 3, respectively, the characteristic line 3 may be optionally defined in accordance with the specification such as of the transformer Tr and the load Z.

Figure 9:
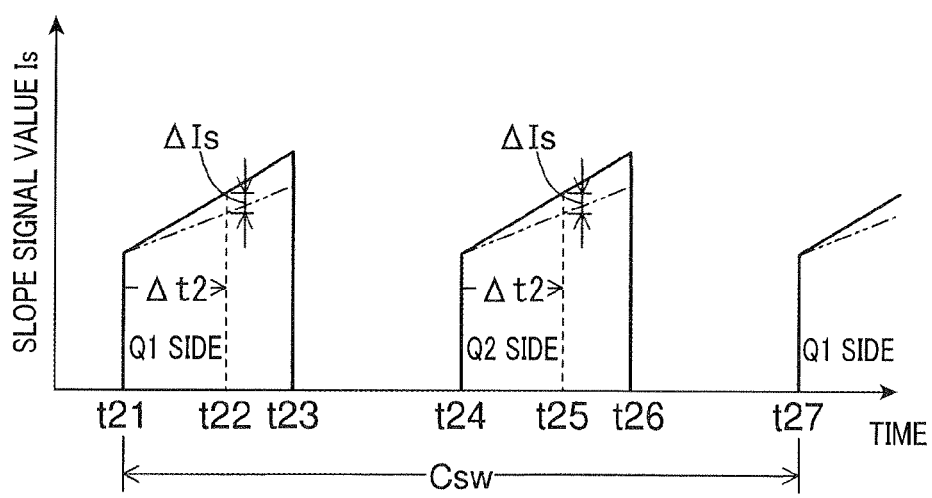
FIG. 9 is a time diagram illustrating an example of change of slope signal.

FIG. 9 shows an example of the slope signal value Is outputted from the slope signal generation section 18b which is configured as described above. Since the switch circuit 11A is configured by a full-bridge circuit, two cycles correspond to a switching cycle Csw in the variation of the slope signal value Is shown in FIG. 9. With respect to the variation of the input voltage Vcs indicated by the chain double-dashed line in FIG. 9, the slope signal value Is increases by an amount of change ΔIs which accords with an elapsed time Δt with reference to a rising edge of each pulse (time t21, t24, t27, etc.). Accordingly, the slope signal value Is exhibits a variation on the basis of the input voltage Vcs, the slope change signal Iinc (change value), the resistor Rs (resistance value), the elapsed time Δt, and the like. The variation is expressed by the following formula. In the formula, the second term on the right-hand side corresponds to the amount of change ΔIs shown in FIG. 9. The slope change signal Iinc exemplified in FIG. 9 indicates positive values. If this indicates negative values, the slope in each pulse will be slanted downward to the right.

$$Is = V_{CS} + \underbrace{\frac{d\,Iinc}{dt} \cdot Rs \cdot \Delta t}_{\Delta Is}$$

Figure 10:
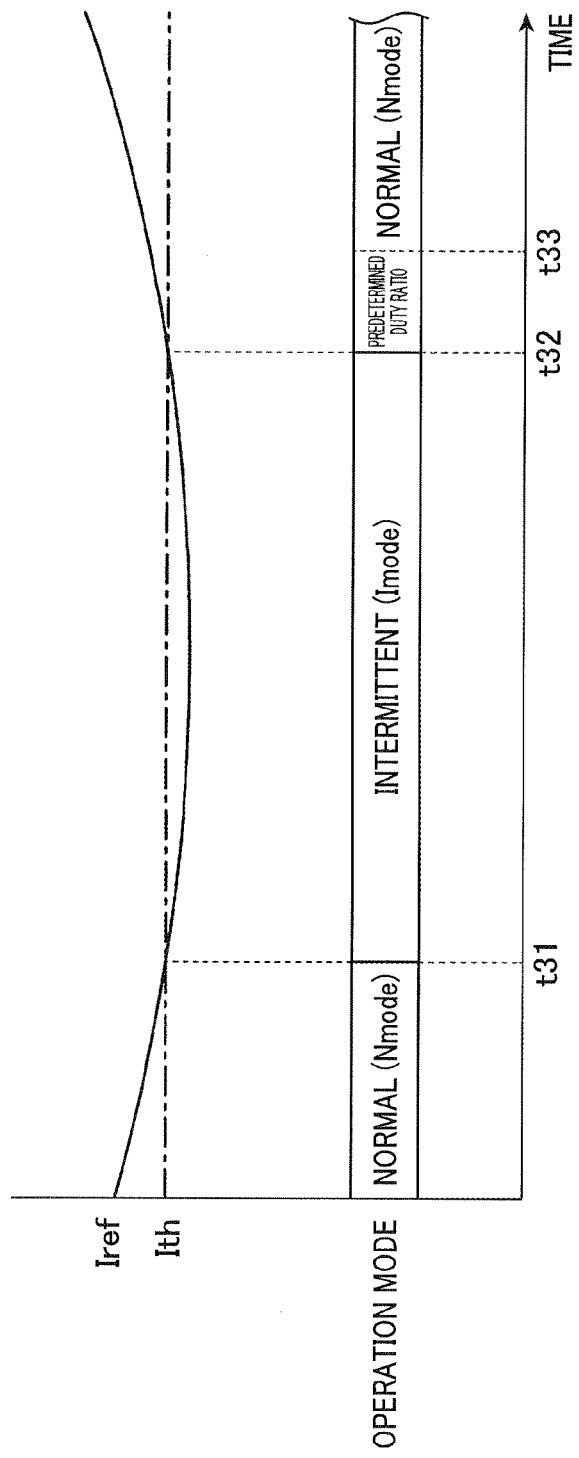
FIG. 10 is a time diagram illustrating an example of switching between a normal mode and an intermittent mode.

Referring to FIG. 10, hereinafter is described the operation mode of the switching elements Q1-Q4 in the power conversion apparatus 10 which is configured as described above. In FIG. 10, the solid line indicates a characteristic line of the control current value Iref and the dash-dot line indicates a characteristic line of the threshold Ith. The characteristic line of the control current value Iref is shown by a simplified curved line for easy comparison with the curved line of the first embodiment. Actually, however, the characteristic line Iref reflects variations of the internal or external operation environment (e.g., feedback control or load Z). The threshold Ith is set to an optionally determined value. However, depending on the operation environment, the threshold Ith may be set to a predetermined value.

As shown in FIG. 10, the control current value Iref is equal to or more than the threshold Ith (Iref Ith) up to time t31 and on or after time t33. Accordingly, the switching determination section 19e switches the operation mode to the normal mode Nmode. In contrast, the control current value Iref is less than the threshold Ith (Iref<Ith) in a period of from time t31 to time t33. Accordingly, the switching determination section 19e switches the operation mode to the intermittent mode Imode. When the switching signal Ichg includes the command signal Icom, the switching elements Q1-Q4 are switched with a predetermined duty ratio (e.g., 1%) during the predetermined time interval of from t32 to t33.

The operation mode of the switching elements Q1-Q4 is switched on the basis of the magnitude correlation between the control current value Iref and the threshold Ith. Therefore, the timing of switching the operation mode varies. In other words, the timing of the switching from the normal mode Nmode to the intermittent mode Imode varies, or the timing of the switching from the intermittent mode Imode to the normal mode Nmode varies.

According to the second embodiment described above, the advantageous effects as described below are obtained. Except for the slope signal generation section 18a and the feedback means 19, the configuration of the power conversion apparatus 10 is similar to that of the first embodiment. Therefore, advantageous effects similar to those of the first embodiment can be obtained.

(2) The mode switching means 19c is configured to change the amount of change ΔIs (amount of change per unit time) of the slope signal value Is (slope signal) on the basis of either or both of the detection voltage values Vd1 and Vd2 (see FIGS. 5 to 10). According to this configuration, the amount of change ΔIs (amount of slope change) that varies in a turn-on period of the pulsed signal is changed. Accordingly, in the event that the input/output conditions are varied, variation in the load current Iout is minimized in switching the operation mode between the normal mode Nmode and the intermittent mode Imode. Accordingly, the system efficiency is enhanced in the entire operating range.

[Third Embodiment]

Figure 11:
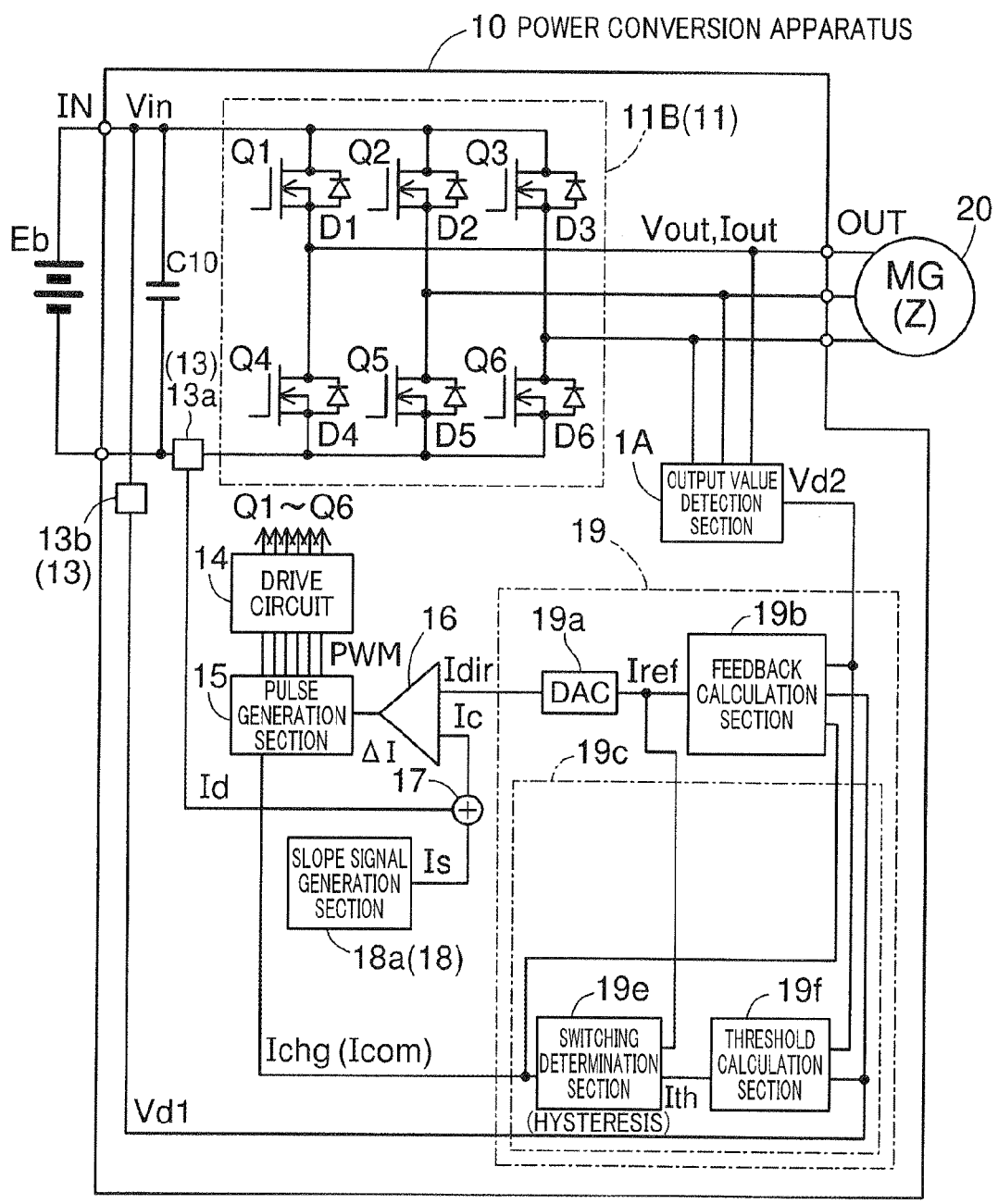
FIG. 11 is a schematic diagram illustrating an example of a third configuration of a power conversion apparatus.
Figure 12:
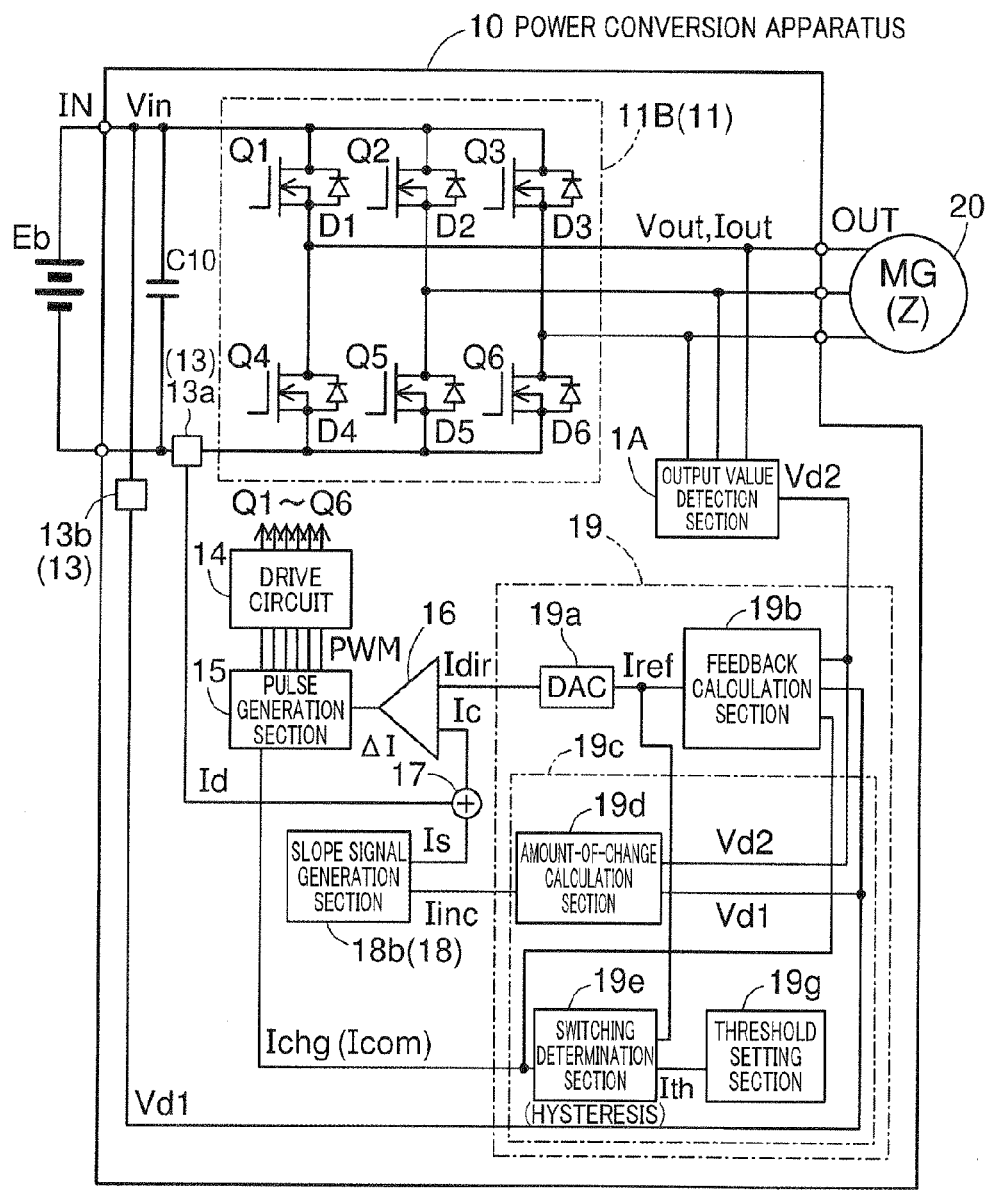
FIG. 12 is a schematic diagram illustrating an example of a fourth configuration of a power conversion apparatus.

Referring to FIGS. 11 to 12, hereinafter is described a third embodiment. In the third embodiment, the components identical with or similar to those in the first and second embodiments are given the same reference numerals for the sake of omitting unnecessary explanation. The third embodiment is described, focusing on the differences from the first and second embodiments.

The third embodiment is different from the first and second embodiments in the switch circuit 11 and the load Z. Unlike the switch circuit 11A of the first embodiment, which outputs constant voltage, a switch circuit 11B of the present embodiment changes the voltage value and the frequency of the output voltage Vout with time. The rotary electric machine 20 as an inductive element (indicated by MG in FIGS. 11 and 12) is applied to the load Z. In other words, the power conversion apparatus 10 according to the second embodiment is an example of an inverter.

Figure 5:
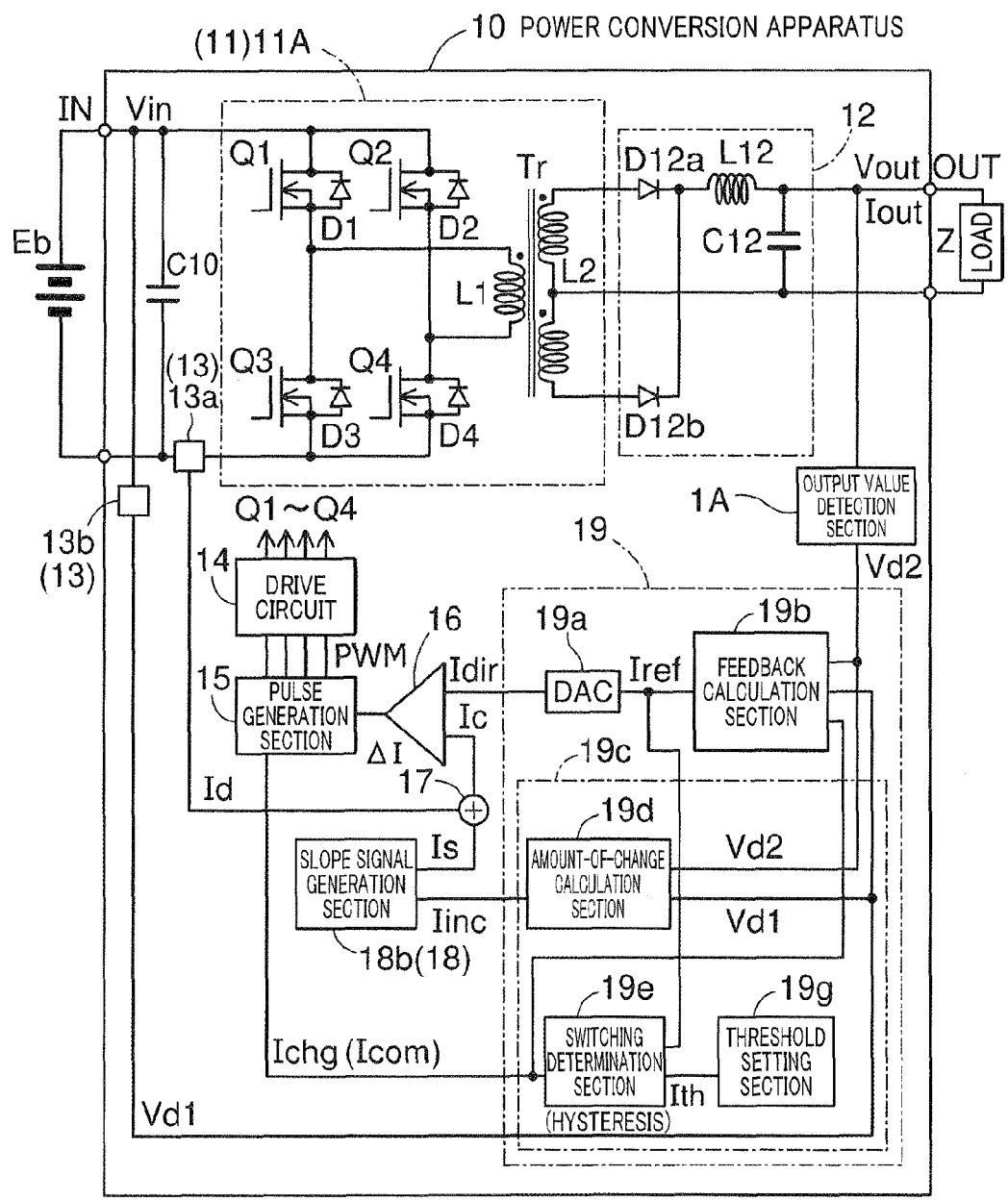
FIG. 5 is a schematic diagram illustrating an example of a second configuration of a power conversion apparatus.

The switch circuit 11B shown in FIGS. 11 and 12 is a replacement of the switch circuits 11A shown in FIGS. 1 and 5. The switch circuit 11B includes switching elements Q1-Q6 and diodes D1-D6. The switching elements Q1-Q6 are each turned on/off according to a pulse-width modulation signal PWM inputted to an input terminal (e.g., gate terminal) from the drive circuit 14. The switch circuit 11B is configured by a half-bridge circuit having an upper arm composed of the switching elements Q1, Q2 and Q3 and a lower arm composed of the switching elements Q4, Q5 and Q6. Each of the diodes D1-D6 is parallelly connected between an input terminal (e.g., drain terminal) and an output terminal (e.g., source terminal) of the corresponding one of the switching elements Q1-Q6. These diodes function as freewheel diodes.

The output terminal of the switching element Q1 and the input terminal of the switching element Q4 are connected to each other via a connecting point which is connected to the output terminal OUT of a first phase (e.g., U phase). The output terminal of the switching element Q2 and the input terminal of the switching element Q5 are connected to each other via a connecting point which is connected to the output terminal OUT of a second phase (e.g., V phase). The output terminal of the switching element Q3 and the input terminal of the switching element Q6 are connected to each other via a connecting point which is connected to the output terminal OUT of a third phase (e.g., W phase).

Since the output voltage Vout is three-phase alternating current, the second detection section 1A detects a voltage value of alternating-current voltage (e.g., instantaneous value, absolute value, peak value and effective value) as a detection voltage value Vd. The rest of the elements of the power conversion apparatus 10 have functions similar to those of the first and second embodiments. Accordingly, the power conversion apparatus 10 according to the third embodiment can realize the control example shown in FIGS. 1 to 4 of the first embodiment and the control example shown in FIGS. 5 to 10 of the second embodiment. Thus, in the event that an input voltage drastically changes from low to high, the rotary electric machine 20 (specifically, magnetic-material core) is prevented from suffering from bias magnetism, and the switching elements Q1-Q6 are also prevented from being damaged.

According to the third embodiment described above, advantageous effects set forth below are obtained. Except for the switch circuit 11B, the configuration of the power conversion apparatus 10 according to the third embodiment is similar to that of the power conversion apparatus 10 according to each of the first and second embodiments. Therefore, the advantageous effects similar to those of the first and second embodiments can be obtained.

[Other Embodiments]

The first to third embodiments for implementing the present invention have so far been described. However, the present invention is not limited to these embodiments. In other words, the present invention may be implemented in various embodiments within a scope not departing from the spirit of the present invention. For example, the present invention may be realized as shown in the following embodiments.

Figure 13:
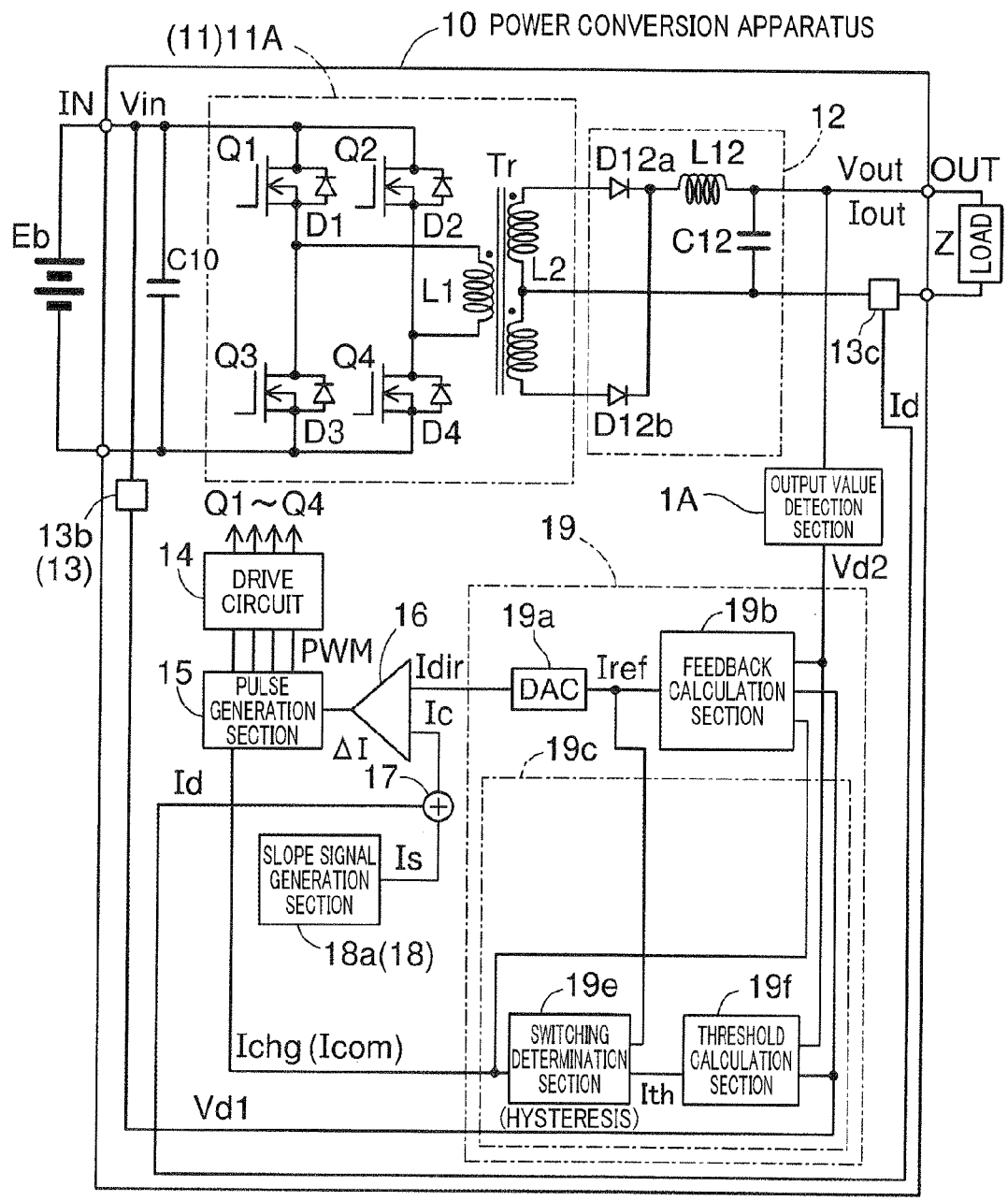
FIG. 13 is a schematic diagram illustrating an example of a fifth configuration of a power conversion apparatus.

The first to third embodiments described above each have a configuration in which the detection voltage value Vd1 inputted to the switch circuit (11A, 11B) is applied to the first detection value (input value) (see FIGS. 1, 5, 11 and 12). Alternatively, the detection voltage value Vd2 outputted from the switch circuit 11 or the detection current value Id inputted to the switch circuit 11 may be applied to the first detection value (input value). Alternatively, as shown in FIG. 13, the detection current value Id outputted from the switch circuit 11 may be applied to the first detection value (input value). One of these input values may be selected and used, or a calculation value based on two or more of these input values (e.g., average value) may be used. Since only the object of the first detection value (input value) is different between these alternative examples, the advantageous effects similar to those of the first to third embodiments can be obtained. Further, in the event that the first detection value (input value, or current value in particular) drastically changes (from low to high in particular), the inductive elements, such as the transformer Tr and the rotary electric machine 20, are prevented from suffering from bias magnetism, and the switching elements included in the switch circuit 11 are also prevented from being damaged.

The first to third embodiments described above each have a configuration in which the detection voltage value Vd2 outputted from the switch circuit (11A, 11B) is applied to the second detection value (output value) (see FIGS. 1, 5, 11 and 12). Alternatively, the detection voltage value Vd1 inputted to the switch circuit 11 (11A, 11B) may be applied to the second detection value (output value). Alternatively, the detection current value Id inputted to the switch circuit 11 (11A, 11B) may be applied to the second detection value (output value). Alternatively, as shown in FIG. 13, the detection current value Id outputted from the switch circuit 11 (11A, 11B) may be applied to the second detection value (output value). One of these output values may be selected and used, or a calculation value based on two or more of these output values (e.g., average value) may be used. Since only the object of the second detection value (output value) is different between these alternative examples, the advantageous effects similar to those of the first to third embodiments can be obtained. Further, in the event that the second detection value (output value, current value in particular) drastically changes (from low to high in particular), the inductive elements, such as the transformer Tr and the rotary electric machine 20, are prevented from suffering from bias magnetism, and the switching elements included in the switch circuit 11 are also prevented from being damaged.

The first to third embodiments described above each have a configuration in which the power conversion apparatus 10 is applied to a DC/DC converter (first and second embodiments) and to an inverter (third embodiment) (see FIGS. 1, 5, 11 and 12). Alternatively, the present invention may be applied to a different power conversion apparatus having a configuration that includes a plurality of switching elements as well as inductive elements, such as the transformer Tr and the rotary electric machine 20, which may suffer from bias magnetism depending on usage. In the event that the input voltage drastically changes from low to high in such a different power conversion apparatus, the inductive elements are prevented from suffering from bias magnetism, and the switching elements included in the switch circuit 11 (11A, 11B) are also prevented from being damaged.

The first and second embodiments described above each have a configuration with an application of the transformer Tr thereto that includes the primary coil L1 and the secondary coil L2 having a center tap (see FIGS. 1 and 5). Alternatively, another configuration may be provided, with an application of a transformer thereto that includes a primary coil and a secondary coil without having a center tap. Further, instead of the two diodes D12a and D12b, the rectifying/smoothing circuit 12 may include four diodes to configure a bridge circuit. Since the configuration of only the transformer is different, advantageous effects similar to those of the first and second embodiments can be obtained.

The first and second embodiments each have a configuration with an application of the transformer Tr thereto as an inductive element (see FIGS. 1 and 5), and the third embodiment has a configuration with an application of the rotary electric machine 20 thereto as an inductive element (see FIGS. 11 and 12). Alternatively, another configuration may be provided, with an application of a coil thereto. In the event that the input voltage drastically changes from low to high in the configuration with an application of a coil thereto, the coil is prevented from suffering from bias magnetism, and the switching elements included in the switch circuit 11 (11A or 11B) are also prevented from being damaged.

Hereinafter, aspects of the above-described embodiments will be summarized.

The power conversion apparatus (10) includes a switch circuit (11, 11A, 11B) which activates switching elements (Q1-Q6) on the basis of a control signal (PWM), a feedback means (19) which performs feedback control, a signal output means (14, 15) which outputs the control signal on the basis of a control variable (Iref) of the feedback control, and a mode switching means (19c) which controls switching operation of the switch circuit by switching an operation mode between a normal mode (Nmode) and an intermittent mode (Imode) in which the number of operations is less than that in the normal mode. The mode switching means changes timing of switching from the normal mode to the intermittent mode, on the basis of either or both of a first detection value (Vd1) which is an input value inputted to the switch circuit and a second detection value (Vd2) which is an output value outputted from the switch circuit.

According to this configuration, the mode switching means changes the timing of switching the operation mode from the normal mode to the intermittent mode on the basis of the first and/or second detection values. Thus, in the event that the input/output conditions are varied, variation of the load current is minimized in switching the operation mode (normal or intermittent mode). Accordingly, the system efficiency is enhanced in the entire operating range.

In the power conversion apparatus, the mode switching means changes an amount of change per unit time of the slope signal (hereinafter, referred to as "amount of slope change") on the basis of either or both of the first detection value and the second detection value.

According to this configuration, the mode switching means changes the amount of slope change on the basis of the first and/or second detection values. Thus, in the event that the input/output conditions are varied, variation in the load current is minimized in switching the operation mode, by changing the amount of slope change that varies in the turn-on period of the pulsed signal. Accordingly, the system efficiency is enhanced in the entire operating range.

In the power conversion apparatus, the mode switching means changes timing of switching the operation mode from the normal mode to the intermittent mode on the basis of the first detection value and the second detection value.

According to this configuration, the mode switching means changes the timing of switching the operation mode from the normal mode to the intermittent mode on the basis of both of the first and second detection values. Thus, in the event that the input/output conditions are varied, variation of the load current is more reliably minimized in switching the operation mode. Accordingly, the system efficiency is more reliably enhanced in the entire operating range.

What is claimed is:

1. A power conversion apparatus, comprising:
   a switch circuit which activates switching elements on the basis of a control signal;
   a feedback controller configured to perform feedback control;
   a signal output configured to output the control signal on the basis of a control variable of the feedback control;
   a mode switching controller configured to control switching operation of the switch circuit by switching an operation mode between a normal mode and an intermittent mode in which the number of operations is less than that in the normal mode;
   a slope signal generator configured to generate and output a slope signal value;
   a signal calculator configured to add up a detection current value inputted to the switch circuit and the slope signal value and output the sum as a composite current value; and
   a signal comparator configured to calculate a differential current value that is a difference between the composite current value and a command current value transmitted from the feedback controller, and the output the differential current value to the signal output, wherein
   the mode switching controller is configured to change timing of switching from the normal mode to the intermittent mode, on the basis of either or both of a first detection value which is an input value inputted to the switch circuit and a second detection value which is an output value outputted from the switch circuit;
   the mode switching controller is configured to change an amount of change per unit time of the slope signal value on the basis of either or both of the first detection value and the second detection value.

2. The power conversion apparatus according to claim 1, wherein
   the mode switching controller is configured to change timing of switching the operation mode from the normal mode to the intermittent mode on the basis of the first detection value and the second detection value.

3. The power conversion apparatus according to claim 1, wherein
   the mode switching controller is configured to apply hysteresis characteristics to the switching between the normal mode and the intermittent mode.

4. The power conversion apparatus according to claim 1, wherein
   the feedback controller is configured to initialize an integral term of the feedback control to zero when the operation mode is switched from the normal mode to the intermittent mode.

5. The power conversion apparatus according to claim 1, wherein
   the feedback controller is configured to change, during the intermittent mode, a gain value used in the feedback control in the subsequent normal mode on the basis of the input value.

6. The power conversion apparatus according to claim 1, wherein
   the mode switching controller is configured to transmit a command signal to the signal output when the operation mode has been switched from the intermittent mode to the normal mode, the command signal corresponding to a command for generating the control signal of a predetermined duty ratio for a predetermined time interval.

7. The power conversion apparatus according to claim 1, wherein
   the switch circuit includes a transformer having a primary coil and a secondary coil, and
   the mode switching controller is configured to use a detection value on the primary coil side as the first detection value and a detection value on the secondary coil as the second detection value.

8. A power conversion apparatus, comprising:
   a switch circuit configured to activate switching elements on the basis of a control signal;
   a feedback controller configured to perform feedback control;
   a signal output configured to output the control signal on the basis of a control variable of the feedback control;
   a mode switching controller configured to control switching operation of the switch circuit by switching an operation mode between a normal mode and an intermittent mode in which the number of operations is less than that in the normal mode;
   a slope signal generator configured to generate and output a slope signal value;
   a signal calculator configured to add up a detection current value inputted to the switch circuit and the slope signal value and output the sum as a composite current value; and
   a signal comparator configured to calculate a differential current value that is a difference between the composite current value and a command current value transmitted from the feedback controller, and the output the differential current value to the signal output, wherein
   the mode switching controller is configured to change timing of switching from the normal mode to the intermittent mode, on the basis of either or both of a first detection value which is an input value inputted to the switch circuit and a second detection value which is an output value outputted from the switch circuit;
   the mode switching controller includes:
      a threshold calculation section configured to calculate a threshold which is a reference value used in switching the normal mode to the intermittent mode on the basis of either or both of the first detection value and the second detection value; and
      a switching determination section configured to determine whether or not the normal mode should be switched to the intermittent mode on the basis of the control variable and the threshold.

9. The power conversion apparatus according to claim 8, wherein
   the mode switching controller is configured to change timing of switching the operation mode from the normal mode to the intermittent mode on the basis of the first detection value and the second detection value.

10. The power conversion apparatus according to claim 8, wherein
    the mode switching controller is configured to apply hysteresis characteristics to the switching between the normal mode and the intermittent mode.

11. The power conversion apparatus according to claim 8, wherein
    the feedback controller is configured to initialize an integral term of the feedback control to zero when the operation mode is switched from the normal mode to the intermittent mode.

12. The power conversion apparatus according to claim 8, wherein
the feedback controller is configured to change, during the intermittent mode, a gain value used in the feedback control in the subsequent normal mode on the basis of the input value.

13. The power conversion apparatus according to claim 8, wherein
the mode switching controller is configured to transmit a command signal to the signal output when the operation mode has been switched from the intermittent mode to the normal mode, the command signal corresponding to a command for generating the control signal of a predetermined duty ratio for a predetermined time interval.

14. The power conversion apparatus according to claim 8, wherein
the switch circuit includes a transformer having a primary coil and a secondary coil, and
the mode switching controller is configured to use a detection value on the primary coil side as the first detection value and a detection value on the secondary coil as the second detection value.

\* \* \* \* \*